United States Patent
Chang

(10) Patent No.: US 9,234,619 B2
(45) Date of Patent: Jan. 12, 2016

(54) TUBE CAP

(71) Applicant: Ching-Jung Chang, Taipei (TW)

(72) Inventor: Ching-Jung Chang, Taipei (TW)

(*) Notice: Subject to any disclaimer, the term of this patent is extended or adjusted under 35 U.S.C. 154(b) by 25 days.

(21) Appl. No.: 14/258,006

(22) Filed: Apr. 21, 2014

(65) Prior Publication Data
US 2015/0300552 A1 Oct. 22, 2015

(51) Int. Cl.
*F16L 55/10* (2006.01)
*F16L 55/115* (2006.01)

(52) U.S. Cl.
CPC .................. *F16L 55/115* (2013.01)

(58) Field of Classification Search
CPC ............. B65B 39/0005; B65B 39/04; B65B 2543/005; B65B 2543/0049; B65B 2543/00509; B65B 2543/00518
USPC .............. 138/89, 96 R, 96 T; 215/247, 355; 220/800, 801
See application file for complete search history.

(56) References Cited

U.S. PATENT DOCUMENTS

| | | | | | |
|---|---|---|---|---|---|
| 787,460 | A | * | 4/1905 | Mosher | 220/801 |
| 1,502,673 | A | * | 7/1924 | Hole | 220/324 |
| 1,758,691 | A | * | 5/1930 | Dolliens | 220/801 |
| 2,649,090 | A | * | 8/1953 | Carr et al. | 604/415 |
| 2,663,451 | A | * | 12/1953 | Yarnall | 220/805 |
| 3,104,681 | A | * | 9/1963 | Gray, Jr. | 138/96 R |
| 3,780,733 | A | * | 12/1973 | Martinez-Manzor | 604/158 |
| 4,046,168 | A | * | 9/1977 | Milne | 138/89 |
| 4,302,918 | A | * | 12/1981 | Rautilo | 52/421 |
| 4,334,632 | A | * | 6/1982 | Watanabe | 220/787 |
| D267,545 | S | * | 1/1983 | Mineo | D9/439 |
| 4,413,748 | A | * | 11/1983 | Kessler et al. | 220/281 |
| 4,930,459 | A | * | 6/1990 | Coffenberry | 123/41.15 |
| 5,503,189 | A | * | 4/1996 | Lamendola | 138/96 R |
| 2004/0016720 | A1 | * | 1/2004 | Egan | 217/99 |
| 2006/0278653 | A1 | * | 12/2006 | Zeyfang et al. | 220/801 |

* cited by examiner

*Primary Examiner* — Patrick F Brinson

(57) ABSTRACT

A cap for covering an end of a tube is disclosed. The cap includes a body, a reinforcement structure, a positioning flange and ribs. The body is of a cup shape. The reinforcement structure is formed on a bottom of the body. The positioning flange is outward formed on a top of the body and has at least one notch. The ribs are outward formed on a peripheral wall of the body. Lower ends of the ribs are formed with tapered slants.

3 Claims, 4 Drawing Sheets

TUBE CAP

BACKGROUND OF THE INVENTION

1. Technical Field

The invention relates to caps, particularly to caps for covering a tube end.

2. Related Art

In civil or construction engineering, many tubes or pipes must be used. Usually, such piping engineering lasts a long period of time. Thus, installed pipelines will be polluted or choked up if they are not protected. To avoid this problem, an end of a tube is always provided with a cap.

On the other hand, before tube s or pipes have been installed, they must be transported, stored or processed. Within this period, the tubes or pipes are easy to be polluted by dust and moisture. The polluted tubes or pipes may become unavailable. Especially in some special usages, for example, ventilation pipes in a clean room, polluted pipes cannot be permitted to use.

It is effective that a tube end is covered by a cap. A conventional cap is provided with a thread to be screwed with a tube. FIG. 6 shows a disk-shaped cap for temporary protection. The cap has a disk body 9, which is plugged in a tube end 2 to prevent foreign matter from entering the tube. Such a cap uses tight fit between an outer cylindrical wall of the disk body 9 and an inner cylindrical wall of the tube end 2 to make a firm connection. The tight fit is formed by surface contact. Thus, considerable friction must be fought when the cap is being installed or removed. It is very laborious. Particularly, removing the cap is much more difficult than installing.

Additionally, the disk-type cap is made by the plastic injection molding process. The molds for plastic injection are very expensive, and thickness of the cap is hard to keep even. Thus the costs of the conventional cap are hard to be reduced. This is a real problem to be solved.

SUMMARY OF THE INVENTION

An object of the invention is to provide a tube cap, which can effectively reduce manufacturing costs.

Another object of the invention is to provide a tube cap, which can be easy to be installed or removed.

To accomplish the above object, the cap of the invention includes a body, a reinforcement structure, a positioning flange and ribs. The body is of a cup shape. The reinforcement structure is formed on a bottom of the body. The positioning flange is outward formed on a top of the body and has at least one notch. The ribs are outward formed on a peripheral wall of the body. Lower ends of the ribs are formed with tapered slants.

DETAILED DESCRIPTION OF THE INVENTION

Figure 1:
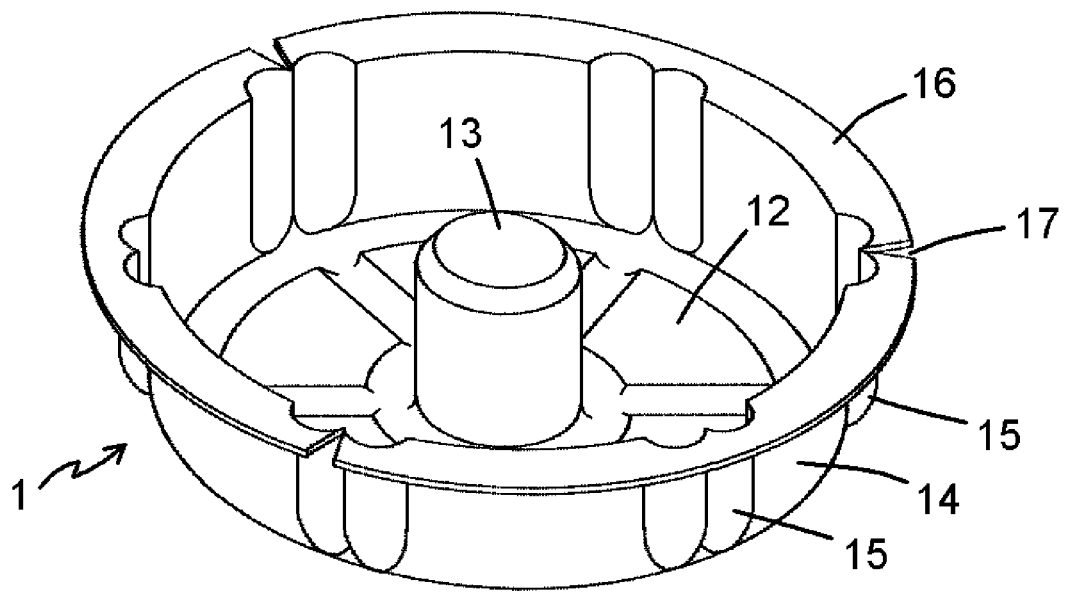
FIG. 1 is a perspective view of the invention.
Figure 2:
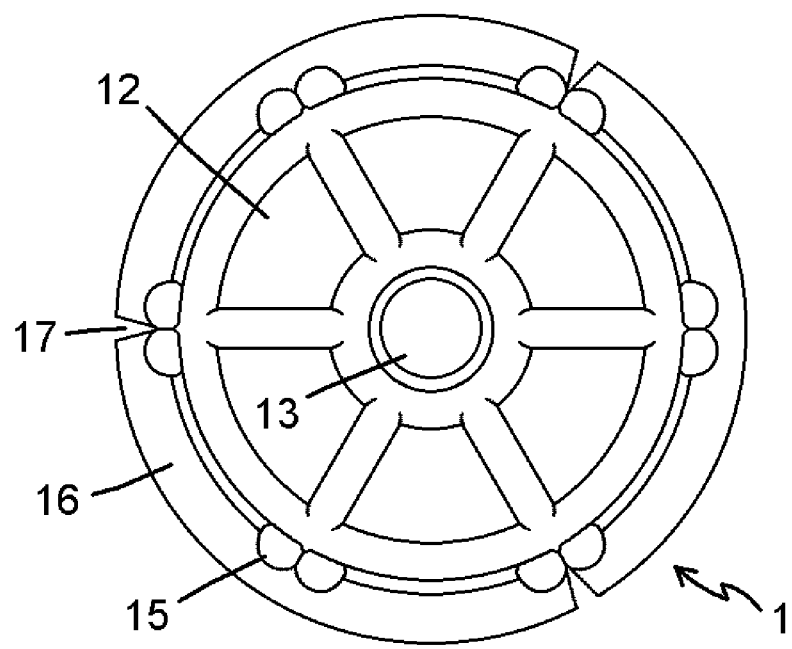
FIG. 2 is a top plan view of the invention.
Figure 3:
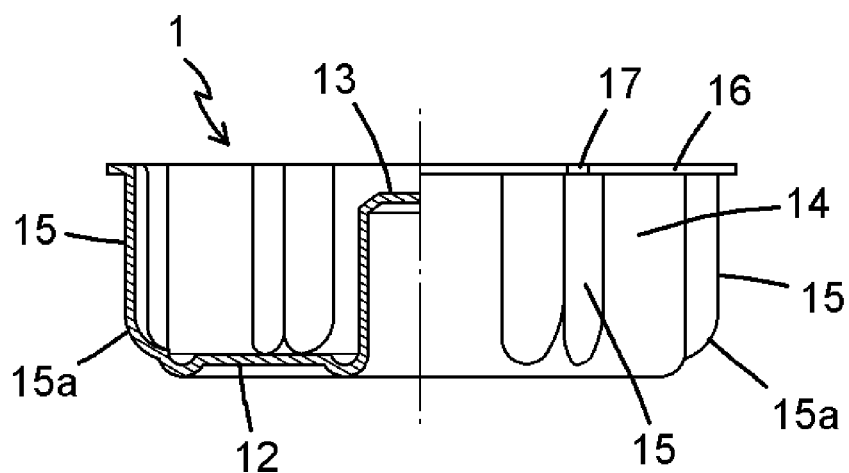
FIG. 3 is a partially cross-sectional view of the invention.

Please refer to FIGS. 1-3. The cap of the invention has a cup-shaped body 1. The body 1 is made of plastic such as PS, PMMA, PC or PVC by the vacuum forming process and has a thickness of 0.1~2.5 mm. The bottom 12 of the body 1 is formed with a reinforcement structure. In this embodiment, the reinforcement structure is concave annular patterns and linear troughs. The reinforcement structure can improve mechanical strength and appearance of the body 1. The center of the body 1 is formed with a handle bar 13 for being held to be removed from a tube end 2.

A peripheral wall 14 upward extends from the bottom 12 of the body 1. An outer diameter of the peripheral wall 14 is slightly less than an inner diameter of the tube end 2 to be installed. An outer surface of the peripheral wall 14 is formed with ribs 15. Lower ends of the ribs 15 are formed with tapered slants 15a which are near the bottom 12. The tapered slants 15a can guide the body 1 to enter the tube end 2 and the ribs 15 abut against an inner side of the tube end 2.

Additionally, the top of the peripheral wall 14 is outward formed with a positioning flange 16 for sealing up the tube end 2. The positioning flange 16 is provided with notches 17. Each of the notches 17 extends from an edge of the positioning flange 16 to the peripheral wall 14. The notches 17 can provide the peripheral wall 14 with elasticity to improve operational easiness in an installing or removing process. In this embodiment, the notches 17 are of a vee shape. Bur other shapes are available, such as a U-shape or a slot.

Figure 4:
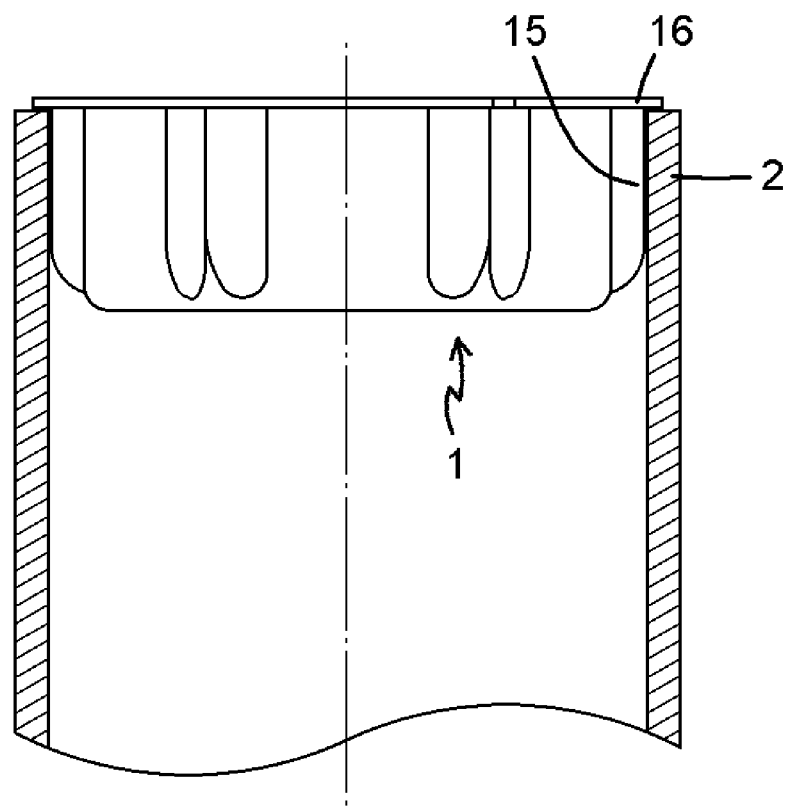
FIG. 4 is a sectional view of the invention installed in a tube end.

As shown in FIG. 4, the body 1 can be plugged into the tube end 2 for sealing up the tube. When installing the cap, press the cap into the tube end 2 until the positioning flange 16 has been stopped by the tube end 2 and the cap is fastened in the tube end 2 by the ribs 15 being pressed by the tube end 2. When removing the cap, exert a force on the handle bar 13 to pull out and then the cap can be easily removed from the tube end 2.

Because the cap is fastened in the tube end by the tube end 2 pressing the ribs 15, the contact area and friction between them has been significantly decreased. Thus the resistance of installing or removing the cap can be effectively reduced. Furthermore, the elasticity from the notches 17 can make installing or removing the cap easier.

Figure 5:
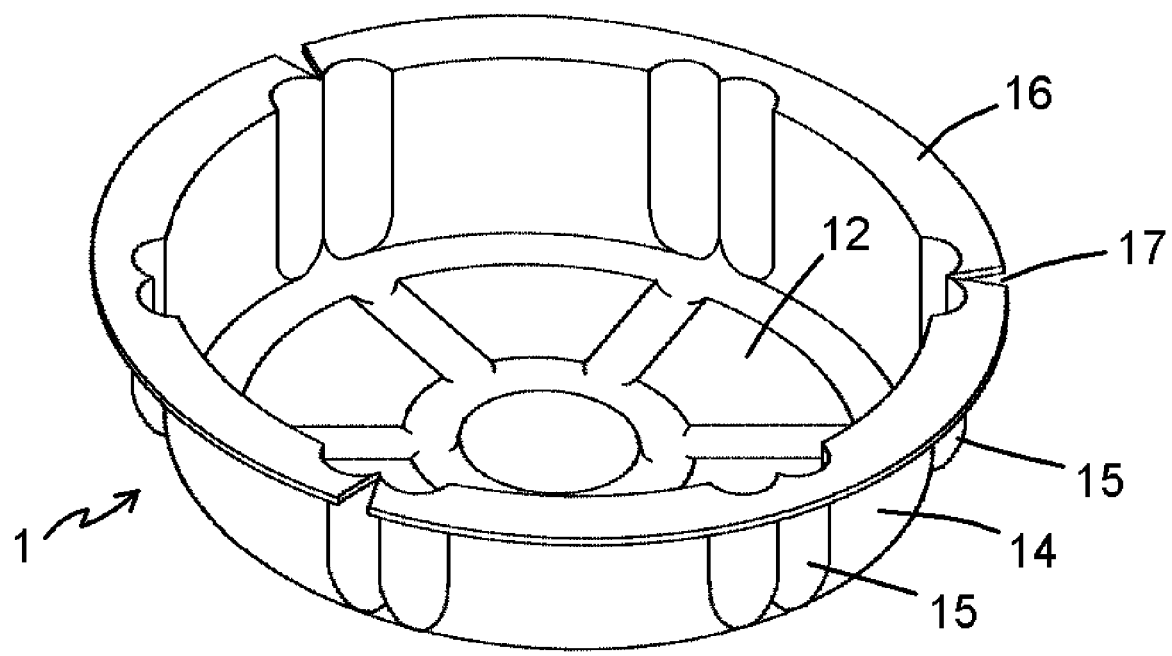
FIG. 5 is a perspective view of another embodiment of the invention.
Figure 6:
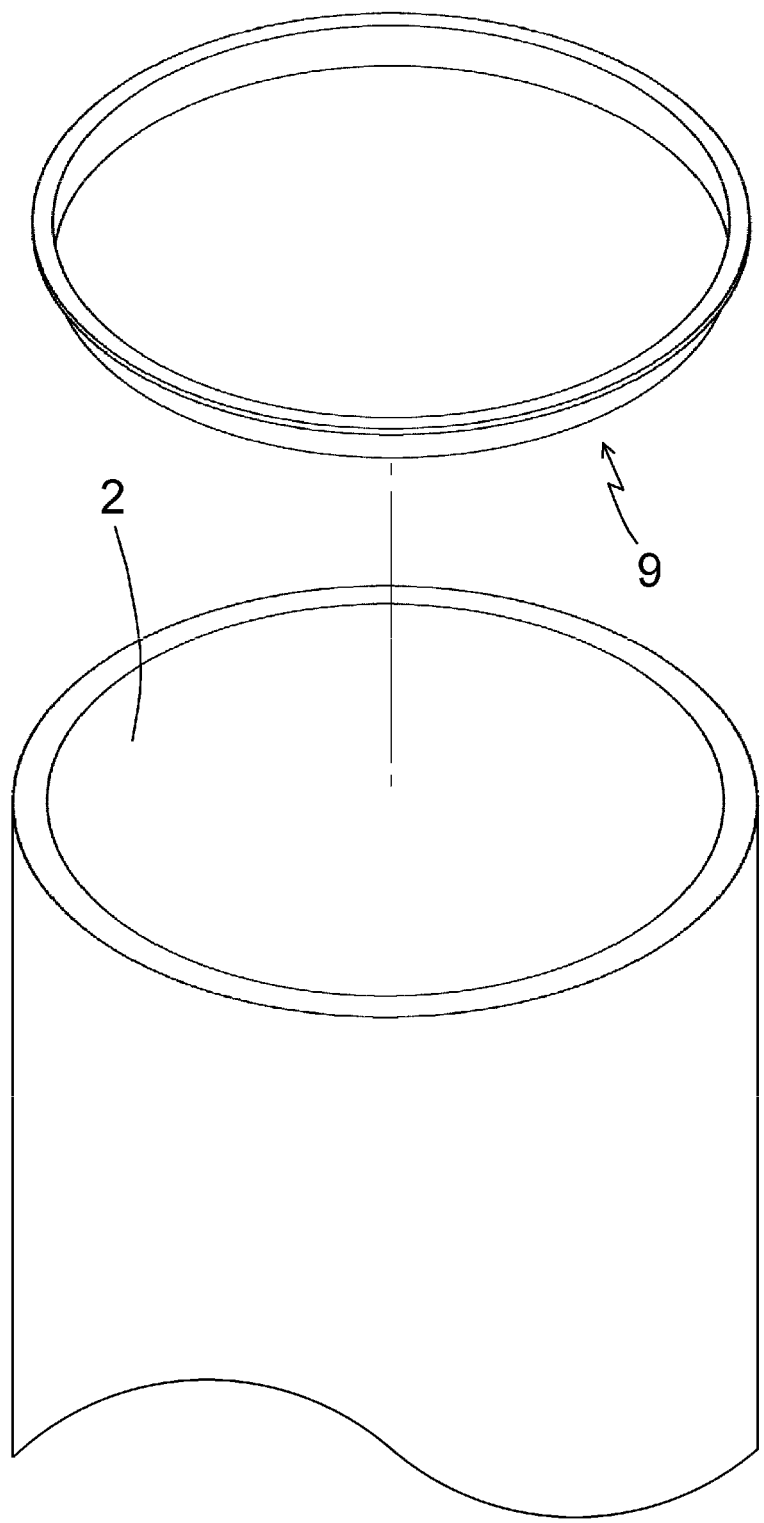
FIG. 6 is a schematic view of a conventional cap and a tube.

FIG. 5 shows another embodiment of the invention. In this embodiment, the handle bar 13 is omitted. This embodiment is suitable for small-sized caps, such as a cap whose diameter is less than 6 mm. Because such a small-sized cap does not has an enough space for receiving a handle bar and does not cause large friction, omitting a handle bar is available.

It will be appreciated by persons skilled in the art that the above embodiments have been described by way of example only and not in any limitative sense, and that various alterations and modifications are possible without departure from the scope of the invention as defined by the appended claims.

What is claimed is:

1. A cap for covering an end of a tube, comprising:
a body, being of a cup shape;
a reinforcement structure, formed by three or more troughs radially arranged on a bottom of the body;
a positioning flange, being outward formed on a top of the body, and having at least one notch; and
ribs, being outward formed on a peripheral wall of the body, lower ends of the ribs being formed with tapered slants;
wherein the ribs are arranged in pairs, each pair of ribs corresponds to one of the troughs in position, a center of the bottom of the body is formed with a cylindrical handle bar, and the troughs are located between the cylindrical handle bar and the peripheral wall of the body.

2. The cap of claim 1, wherein the at least one notch extends from an edge of the positioning flange to the peripheral wall.

3. The cap of claim 2, wherein the notch is of a vee shape.

\* \* \* \* \*